United States Patent
Kudelski et al.

(10) Patent No.: US 12,165,294 B2
(45) Date of Patent: Dec. 10, 2024

(54) METHOD FOR HIGH RESOLUTION IMAGE INPAINTING, PROCESSING SYSTEM AND ASSOCIATED COMPUTER PROGRAM PRODUCT

(71) Applicant: TCL RESEARCH EUROPE SP. Z O. O., Warsaw (PL)

(72) Inventors: Michal Kudelski, Warsaw (PL); Tomasz Latkowski, Warsaw (PL); Filip Skurniak, Warsaw (PL); Lukasz Sienkiewicz, Warsaw (PL); Piotr Frankowski, Warsaw (PL); Bartosz Biskupski, Warsaw (PL)

(73) Assignee: TCL RESEARCH EUROPE SP. Z O. O., Warsaw (PL)

( * ) Notice: Subject to any disclaimer, the term of this patent is extended or adjusted under 35 U.S.C. 154(b) by 465 days.

(21) Appl. No.: 17/623,330

(22) PCT Filed: Mar. 24, 2020

(86) PCT No.: PCT/PL2020/050023
§ 371 (c)(1),
(2) Date: Dec. 28, 2021

(87) PCT Pub. No.: WO2021/194361
PCT Pub. Date: Sep. 30, 2021

(65) Prior Publication Data
US 2022/0366544 A1  Nov. 17, 2022

(51) Int. Cl.
*G06T 5/77* (2024.01)
*G06T 3/40* (2024.01)
*G06T 3/60* (2024.01)

(52) U.S. Cl.
CPC .................. *G06T 5/77* (2024.01); *G06T 3/40* (2013.01); *G06T 3/60* (2013.01);
(Continued)

(58) Field of Classification Search
CPC ............ G06T 7/11; G06T 2207/20084; G06T 2207/20021; G06T 3/40; G06T 5/60;
(Continued)

(56) References Cited

U.S. PATENT DOCUMENTS

2021/0125313 A1* 4/2021 Bai ................... G06V 10/806
2021/0150678 A1* 5/2021 Yi .................... G06T 3/4046

OTHER PUBLICATIONS

Liu, G., Reda, F. A., Shih, K. J., Wang, T. C., Tao, A., & Catanzaro, B. (2018). Image inpainting for irregular holes using partial convolutions. In Proceedings of the European conference on computer vision (ECCV) (pp. 85-100). (Year: 2018).*

(Continued)

*Primary Examiner* — Andrae S Allison
*Assistant Examiner* — Emmanuel Silva-Avina
(74) *Attorney, Agent, or Firm* — ANOVA LAW GROUP, PLLC (57) ABSTRACT

A computer-implemented method for high resolution image inpainting comprising the following steps: providing a high resolution input image, providing at least one inpainting mask, selecting at least one rectangular sub-region of the input image and at least one aligned rectangular subregion of the inpainting mask such that the rectangular subregion of the input image encompasses at least one set of pixels to be removed and synthetized, the at least one sub-region of the input image and its corresponding aligned subregion of the inpainting mask having identical minimum possible size and a position for which a calculated information gain does not decrease, processing the sub-region of the input image and its corresponding aligned subregion of the inpainting mask by a machine learning model, generating an output high resolution image comprising the inpainted sub-region.

11 Claims, 6 Drawing Sheets

(52) U.S. Cl.
 CPC ............... *G06T 2207/20081* (2013.01); *G06T 2207/20084* (2013.01); *G06T 2207/20104* (2013.01); *G06T 2207/20132* (2013.01)

(58) Field of Classification Search
 CPC ......... G06T 5/77; G06T 11/00; G06T 11/001; G06T 11/40; G06T 15/503; G06T 2207/10024; G06T 2207/20036; G06T 2207/20081; G06T 2207/20104; G06T 2207/20132; G06T 3/4046; G06T 3/60; G06T 5/70; G06T 5/73; G06T 5/80
 USPC ......................................................... 382/155
 See application file for complete search history.

(56) References Cited

OTHER PUBLICATIONS

The World Intellectual Property Organization (WIPO) International Search Report for PCT/PL2020/050023 Dec. 9, 2020 1 Page.
Xiuxia Cai et al., Semantic object removal with convolutional neural network feature-based Inpainting approach. Multimedia Systems, Feb. 1, 2018, vol. 24, No. 5, pp. 597-609.
Jiahui Yu et al., Generative Image Inpainting with Contextual Attention 2018 IEEE/CVF Conference on Computer Vision and Pattern Recognition, 2018, pp. 5505-5514.
Connelly Barnes et al., PatchMatch: A Randomized Correspondence Algorithm for Structural Image Editing, ACM Transactions on Graphics, 28(3), 2009.
Guilin Liu et al., Image Inpainting for Irregular Holes Using Partial Convolutions, 2019, pp. 89-105.

\* cited by examiner

METHOD FOR HIGH RESOLUTION IMAGE INPAINTING, PROCESSING SYSTEM AND ASSOCIATED COMPUTER PROGRAM PRODUCT

CROSS-REFERENCE TO RELATED APPLICATION

This application is a US National Stage of International Application No. PCT/PL2020/050023, filed on Mar. 24, 2020, the content of all of which is incorporated herein by reference.

FIELD OF THE DISCLOSURE

The present invention relates to a method for high resolution image inpainting, particularly for mobile devices. The invention also relates to a processing system able to implement the method and a computer program product associated with the method.

BACKGROUND

Inpainting is the process of reconstructing missing, lost or deteriorated parts of images and videos. It can be used for automated scene editing, photo retouching, restoring old photos and videos, and many other applications.

There are many existing inpainting technologies based on classical computer vision methods, one of them being disclosed in Jiahui Yu, Zhe Lin, Jimei Yang, Xiaohui Shen, Xin Lu, Thomas S. Huang. "Generative Image Inpainting with Contextual Attention" 2018. There are also many existing inpainting technologies based on machine learning methods, for example those ones disclosed in Connelly Barnes, Eli Shechtman, Adam Finkelstein, and Dan B Goldman. "PatchMatch: A Randomized Correspondence Algorithm for Structural Image Editing". 2009, Guilin Liu, Fitsum A. Reda, Kevin J. Shih, Ting-Chun Wang, Andrew Tao, Bryan Catanzaro. "Image Inpainting for Irregular Holes Using Partial Convolutions". 2019.

However the existing technologies possess defects. Classical computer vision approaches often produce non-realistic effects for more complex scenes, as they do not include any semantic information and they are usually based on patch matching and copy-pasting. Machine learning approaches are usually verified in lower resolutions (such as 256×256 or 512×512) and cannot be efficiently deployed on mobile platforms for high resolution images (such as 4K images).

Thus there is still a need to provide a method of inpainting reliable for complex scenes as well as suitable for high resolution images, especially for mobile devices where constraints for memory and computational power exist.

DISCLOSURE OF THE INVENTION

Starting from the depicted prior art, the invention is based on the object of developing a method for image inpainting which would be suitable, firstly, for ensuring high resolution image processing without an additional computational power, and, secondly, for being able to be implemented on mobile phones while guaranteeing good quality inpainting.

This object is achieved by a high resolution image inpainting method, a processing system comprising an image processing pipeline according to the invention, and a computer program product associated to.

According to a first aspect of the invention a computer-implemented method for high resolution image inpainting is provided. The method comprises providing a high resolution input image, providing at least one inpainting mask indicating at least one set of pixels to be removed and synthetized, selecting at least one rectangular subregion of the input image and at least one aligned rectangular subregion of the inpainting mask such that the rectangular subregion of the input image encompasses at least one set of pixels to be removed and synthetized, said at least one subregion of the input image and its corresponding aligned subregion of the inpainting mask having identical minimum possible size and a position for which a calculated information gain does not decrease, processing said subregion of the input image and its corresponding aligned subregion of the inpainting mask by a machine learning model in such a manner that an inpainted subregion of the input image along with at least one synthetized set of pixels fitting the surrounding parts of the input image both semantically and visually is received, generating an output high resolution image comprising said inpainted subregion having at least one synthetized set of pixels fitting the surrounding parts of the input image both semantically and visually.

Advantageous developments of the method for high resolution image inpainting according to the invention are specified in the dependent claims. In particular, the method in accordance with the invention may also have one or more of the following features, separately or in combination:
- the step of selecting at least one rectangular subregion of high resolution image and at least one aligned rectangular subregion of inpainting mask comprises acquiring information on mask regions located within the selected inpainting mask.
- the step of selecting at least one rectangular subregion of high resolution image and at least one aligned rectangular subregion of inpainting mask comprises also a step of mask region clustering.
- the step of providing an inpainting mask comprises an automatic inpainting mask proposal.
- the method further comprises a step of post-processing of provided inpainting mask so as it fulfills the machine learning model requirements.
- the step of inpainting mask post-processing also comprises manual user-defined mask refinement.
- the method further comprises a step of rotating the selected image subregion and selected mask subregion before processing by the machine learning model.
- the method further comprises a step of re-rotating the inpainted subregion outputted by the machine learning model.
- the method further comprises a step of downscaling of at least one selected image subregion and at least one selected mask subregion, so as to adjust its resolution to be within a predefined set of supported resolutions of the machine learning model.
- the method further comprises a step of upscaling of the inpainted subregion outputted by the machine learning model.
- the step of generating an output high resolution image comprises blending of the inpainted subregion into the input high resolution image with the use of the provided inpainting mask.

According to a second aspect of the invention a processing system implementing the method according to the invention is provided.

According to a third aspect of the invention a mobile phone comprising the processing system according to the invention is provided.

According to a fourth aspect of the invention a computer program product is provided, comprising instructions, which when executed by a processor, cause the processor to perform operations of the method for high resolution image inpainting according to the invention.

The proposed invention allows users to select parts of images (manually or semi-automatically) which should be removed from images, and the missing part is automatically reconstructed based on the "non-missing" area of the image. The proposed invention can be efficiently deployed on a mobile device and process images in high resolution (e.g., in 4K resolution) directly on a mobile device.

Thanks to a step of image/mask crop selection it is possible to find an optimal image/mask crop allowing processing with some computational power constraints while providing enough information to receive a good quality inpainted image crop at the output of the machine learning model.

The proposed pipeline allowed to implement a high quality inpainting feature on a mobile device. The inpainting feature supports inpainting on high resolution images (up to 4K), utilizes powerful machine learning models to achieve competitive visual quality of results, and runs directly on a mobile computing platform (without any external services required).

BRIEF DESCRIPTION OF THE DRAWINGS

Other advantages and features will become apparent on reading the description of the invention and from the appended drawings, in which.

DETAILED DESCRIPTION

Figure 1:
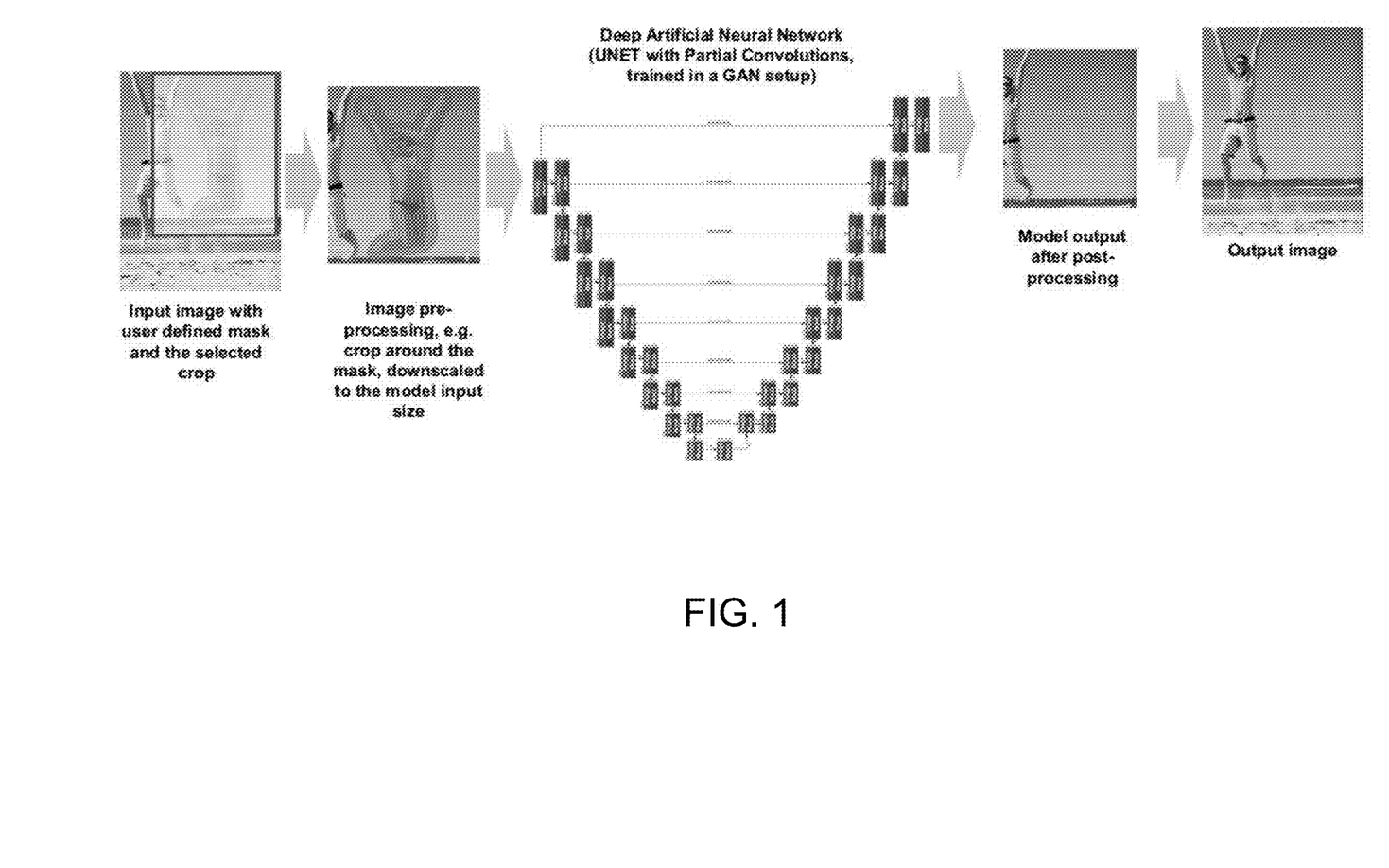
FIG. 1. shows a general steps of the method for image inpainting according to the invention.

FIG. 1 shows a high-level view of the proposed method for image inpainting, especially for high resolution image inpainting. A high resolution input image undergo a selection of a smaller region (an image subregion) in which an object to be removed is located. A special inpainting mask within said smaller region, i.e within said image subregion defines the exact set of pixels to be removed from the input image. Then preprocessed smaller image region along with the inpainting mask are passed to a trained neural network for processing. At the machine learning model output an image subregion with a synthetized set of pixels is received and after a postprocessing a whole output image is received with an inpainted region.

Figure 2:
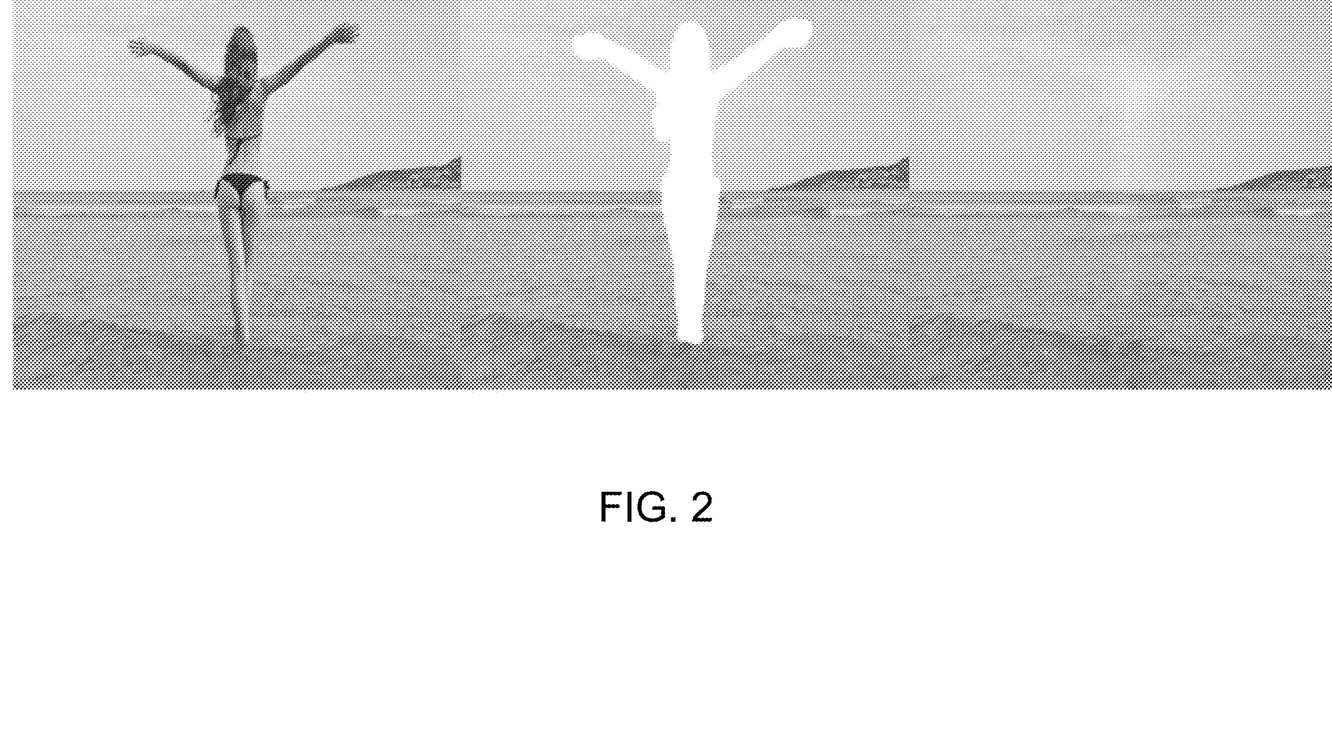
FIG. 2 shows an example of one possible purpose of image processing according to the invention.

As shown in FIG. 2, one of purposes for which the method according to the invention can be used is removal of people from images. It can be observed that the inpainting method according to the invention provides plausible result for the user, also for complex scenes.

Figure 3:
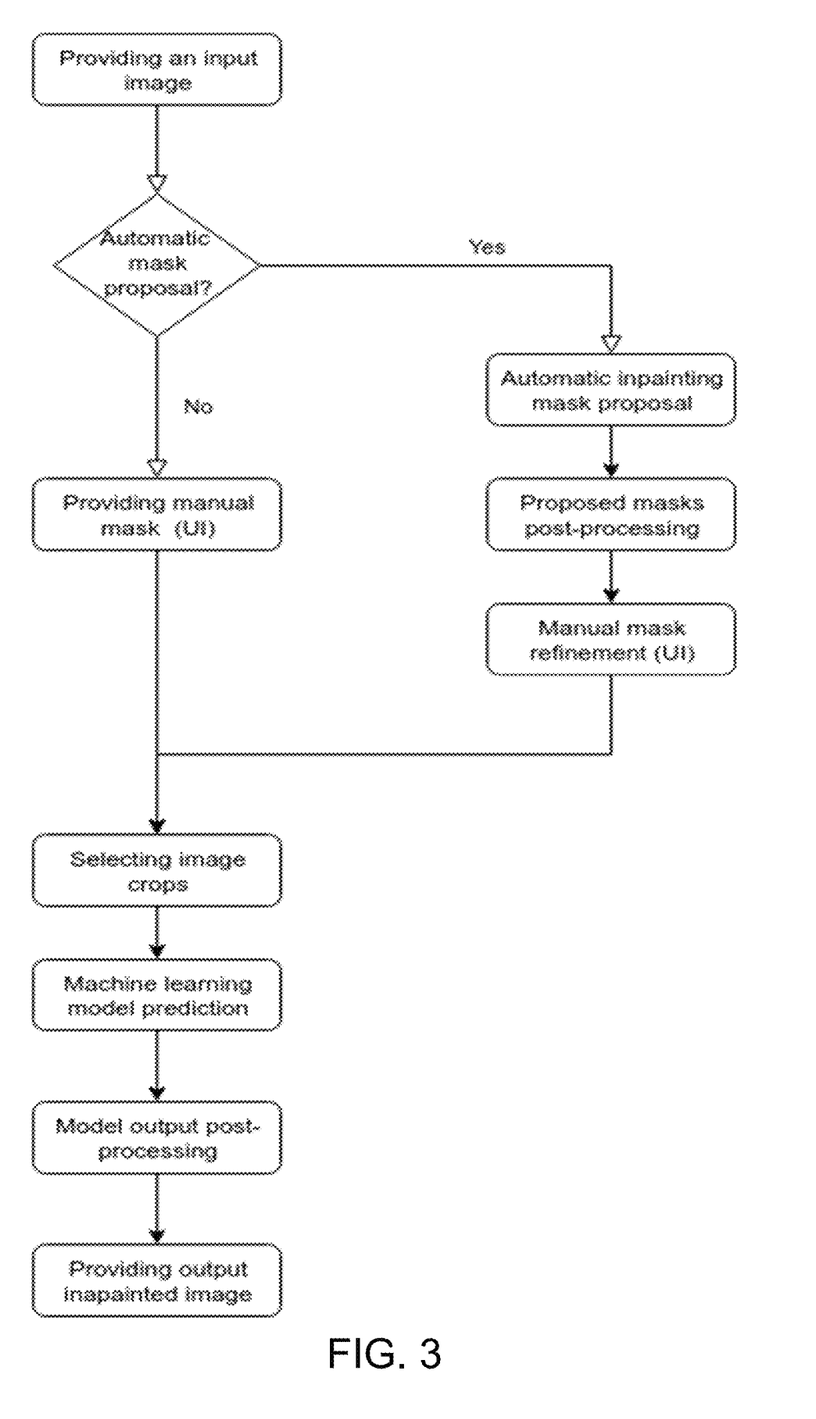
FIG. 3 is a flow chart of the method in accordance with one embodiment of the invention.

Now the method for image inpainting according to the invention will be described in reference to FIG. 3 which shows an associated flow chart of steps. The proposed inpainting system is composed of several steps.

The method begins by providing an input image. The input image can be an image registered by a digital camera, in particular on a mobile device, and written into a memory. Nowadays images of different sizes are captures by digital cameras. In particular current digital cameras embedded into mobile devices typically register images of 2048 px×1536 px, 3024 px×4032 px, etc. The step of providing an input image comprises preferably reading it from a memory, acquiring image parameters, in particular its size and resolution, and optionally displaying it on a display for user perception. Alternatively, the input image and parameters can be captured directly from the camera.

The method then passes to a step of providing an inpainting mask. A 'mask' should be understood as a binary image of the same resolution as the input image—i.e., the mask consists of pixels that have one of exactly two colors, typically black and white. 'An inpainting mask' should be understood as a mask indicating which pixels should be removed from the input image and replaced with pixels generated by the inpainting method. For example, when a pixel at a given location in the inpainting mask is black, we need to remove the pixel from said location from the input image. The step of providing an inpainting mask preferably comprises drawing a user-defined inpainting mask manually through the user interface (UI) of the mobile device. For example, the user can use a touchscreen and select pixels to be removed using a paintbrush tool.

In one preferred embodiment the step of providing an inpainting mask comprises an automatic inpainting mask proposal. The optional step of automatic inpainting mask proposal comprises a step of input image analyzing. The input image is analyzed using a semantic image segmentation model in order to detect objects. One of the existing image segmentation technologies can be a machine-learning based models. The segmentation model is fine-tuned for the purpose of generating high-quality inpainting masks of typically removed objects (e.g., people, cars, trash, etc.), Based on detected objects and their segmentation, said step ends with automatically proposing an inpainting mask—i.e. the mask indicating which objects within the input image could be removed in one of the next steps and replaced later by a reconstructed background.

In one another embodiment the proposed inpainting mask is carefully post-processed to meet the inpainting model requirements (including: smoothing and coherence improvements) in a substep of automatic mask post-processing. This step can comprise operations such as morphological erosion and dilation, blurring and thresholding. Here the 'inpainting model' means the model described in the further machine learning model prediction step, while the 'inpainting model requirements' means that the inpainting mask provided in the method according to the invention should be similar in terms of smoothness and coherence to masks used during machine learning model training. For example, black pixels within the selected inpainting mask should form smooth, coherent and regular shapes such as overlapping lines, curves or ellipses. Thanks to the automatic inpainting mask post processing it is possible to avoid noise and artifacts generated by a machine learning model due to differences between the training data and the data used during prediction.

Preferably, this step of mask post-processing also comprises manual user-defined mask refinement. For example, only certain objects from the inpainting mask after the automatic mask post-processing step may be chosen. The inpainting mask, once selected, can be refined by the user through the user interface UI. For example, user can use paintbrush and eraser tools to adjust the precise layout of pixels within the inpainting mask.

Then the method passes to a step of input image and selected inpainting mask pre-processing. Knowing the input image resolution and at least one final inpainting mask, namely at least one selected and optionally refined inpainting mask, it can be determined automatically how to extract image parts (i.e. image subregions) that should be then pre-processed and passed further to the machine learning model.

In particular, the step of input image and selected inpainting mask pre-processing comprises a step of selecting at least one image crop to be extracted from the input image and at least one aligned mask crop. 'An image crop' should be understood here as a rectangular crop of the input image, namely a rectangular subregion of the input image, smaller than the whole image. 'A mask crop' should be understood here as the corresponding rectangular crop of the inpainting mask (with the same coordinates as the image crop), namely a rectangular subregion of the inpainting mask, smaller than the whole inpainting mask. Thus, an image crop is always aligned with the corresponding mask crop. It is decided within said step how many crops should be extracted from the input image (and the corresponding inpainting mask) and how they should be processed (rotate, re-scale, etc.) in order to obtain the best quality results as efficiently as possible.

The step of selecting at least one image crop and at least one aligned mask crop comprises acquiring information on mask regions located within the selected inpainting mask. 'A mask region' should be understood as a set of pixels forming a continuous shape within the inpainting mask (of the same color —e.g. black—indicating pixels to be removed). For example, FIGS. 4 A-4 C show inpainting masks with a single mask region within each inpainting mask, while FIG. 5 shows examples of masks composed of several mask regions.

For a single mask region detected within the selected inpainting mask, the system analyzes the resolution of the input image and the size and shape of this mask region (for example, calculating its minimal bounding box). Based on this information, the optimal image/mask crop size and position, and as a consequence, identical optimal image crop size and position are selected in order to minimize the number of processed pixels (for the purpose of performance) while providing enough information for the inpainting model (for the purpose of reconstruction quality). The image/mask crop size is selected among available image/mask crop sizes starting from the smallest possible. The information gain after increasing the crop size can be estimated based on the ratio of black and white pixels within the mask crop and based on statistics calculated for non-removed pixels within the image crop (such as standard deviation, variance, etc.). Based on the estimated information gain a decision is made whether a bigger crop size is profitable (using the parametrized threshold). The system can also consider rotated rectangular crops in order to find the best fit (based on the minimal bounding box including rotations calculated for the mask region). When this feature is activated and the estimated information gain is higher for rotated crops, namely for rectangular crops having their sides rotated in relation to image main axes the system can decide to output rotated crops.

The set of available mask/image crop sizes is defined according to particular inpainting model characteristics and hardware specification (e.g., memory and CPU limitations). For example, for a 4K image the available set of crops may include the following rectangles: 512×512, 512×1024, 1024×1024, 2048×2048, 1024×4096, 512×4096, etc. Depending on the hardware specification, for example for a device having less than 4 GB of memory only the following rectangles would be considered: 512×512, 512×1024, 1024×1024.

Figure 4A:
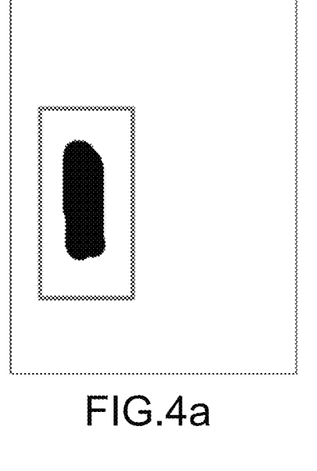
FIG. 4A-4C show exemplary masks and crops.
Figure 4B:
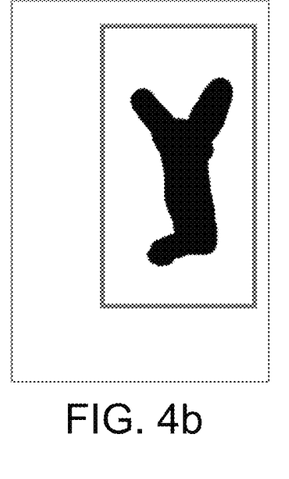
Figure 4C:
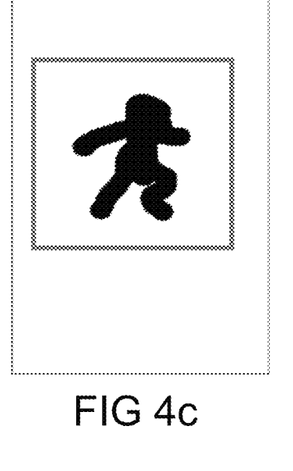
Figure 5:
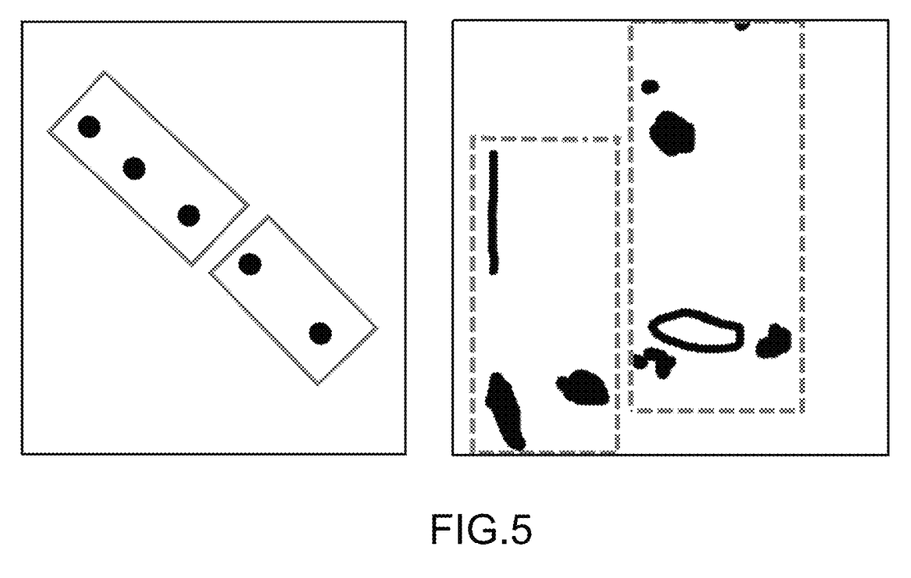
FIG. 5 shows exemplary results of mask region clustering according to the invention.

FIGS. 4 A-4 C show exemplary inpainting masks and exemplary mask crops containing exemplary mask regions. As it is shown in the FIG. 4A and FIG. 4B a mask region can be of a simple and slim shape (colored in black) thus an associated assigned mask crop would be rectangular (a rectangle marked in red) As it is shown in the FIG. 4C, a mask region can be of more complex and wide shape and then associated assigned mask crop would be a square.

In one embodiment, preferably, the step of selecting at least one image crop and at least one mask crop comprises also a step of mask region clustering. When an inpainting mask is composed of many mask regions, the method passes to a step of mask regions clustering. Each mask region is first surrounded with a minimal bounding box (also rotated in relation to image main axes if required). Then, available set of crop sizes is verified. If possible, a single mask crop is always preferred. If it is impossible to surround mask regions with a single crop, mask regions close to each other are grouped together. The clustering algorithm minimizes the number of mask crops required to cover all mask regions. As a result, several mask/image crops can be passed further to the machine learning inpainting model (see FIG. 5 for examples).

Depending on hardware capabilities, the selected mask/image crop may be also further down-scaled to reduce computations, e.g. a 2048×2048 crop can be down-scaled to 1024×1024 or 512×512 model input (depending on parameters). The image crop can be down scaled using the bicubic method, and the mask crop can be down scaled using the nearest neighbor method (suitable for binary images). To summarize, in the step of selecting at least one image crop and at least one mask crop the decision on what kind of crop should be chosen is made. In particular, parameters of the image crop and mask crop can be adjusted to hardware limitations. For example, in one of preferred embodiment knowing that the hardware is a low-end smartphone with limited CPU/memory and that approximately 20% of the initial high resolution image has been selected for removal, we would use the 1024×1024 crop and downscale it to the 256×256 resolution. Knowing that the hardware is a high-end smartphone with powerful CPU, the same case would be handled with a 1024×1024 crop without down scaling. The result of this step is a list of image crop and mask crop pairs that are passed further as machine learning model inputs.

Image pre-processing based on an input image and an input mask allows the powerful machine learning model to be used within a high-resolution inpainting pipeline on devices with limited resources. The method according to the invention allows automatically extracting smaller parts, i.e crops of a high-resolution image that can be processed by a machine learning model in a lower resolution on a mobile device.

Then the method passes to a step of machine learning model prediction. Here, the previously trained inpainting model is used for processing at least one image crop and at least one mask crop in order to receive an inpainted image crop. Typically, a convolutional neural network CNN is used. Typically, training a CNN involves iteratively applying inputs to an input layer of the CNN and comparing desired outputs with actual outputs at the output layer of the CNN to calculate error terms. These error terms are used to adjust weights and biases in the hidden layers of the CNN so that the next time around the output values will be closer to the correct values.

The inpainting machine learning model according to the invention takes as input at least one image crop of the input image and at least one corresponding mask crop of the inpainting mask (indicating which parts of the input should be removed and reconstructed). The machine learning model outputs an inpainted image crop with missing/removed parts reconstructed. The model is trained to provide a good quality inpainting. 'Good quality inpainting' should be understood as follows: the reconstructed pixels should fit the surrounding parts of the input image both semantically and visually. For example, having a photo of a dog on a grass, when we remove the dog from the input image, the reconstructed pixels should represent the grass (semantic fit) and they should smoothly fill the removed area of the input image making it undistinguishable from the surrounding areas (visual fit). These objectives can be measured during training and they can be used to guide the training process.

For example, the above objectives are measured during machine learning as follows: semantic similarity between the reconstructed area and its neighborhood (for example, based on semantic features extracted from a pre-trained convolutional neural network CNN), perceptual and style similarity (for example, based on L1 distance between the input image and the reconstructed image calculated in the semantic features space), smoothness (for example based on total variation). These values can be relatively easily calculated for the reconstructed images and they can be used as metrics to estimate the quality of inpainting (it is observed that high value of these metrics is correlated with subjective visual evaluations of the inpainting results). The same metrics can be used to determine the method used for inpainting: if two methods produce similar values of several metrics, it is very likely that a very similar method was used for inpainting.

The inpainting machine learning model operates in a pre-defined resolution and within the predefined set of input sizes. Typically the model can support the following inputs: 512×512, 256×1024, 256×768. One or more of image crops and mask crops selected in the previous step need to be adjusted to one of the supported model input shapes, for example a 1024×4096 crop needs to be down scaled to 256×1024 resolution before feeding it into the model. In a preferred embodiment the resolution of the machine learning model can be adjusted to the hardware limitations. For example, the above model can be replaced with a model supporting 256×256, 128×512 and 128×384 inputs in order to reduce the computational costs. The output of the inpainting machine learning model, namely an inpainted image crop, always has the same resolution as the input. For example, given the 512×512 input image crop and the corresponding 512×512 mask crop, the model returns the 512×512 inpainted image crop.

Then, preferably, the method according to the invention passes to a step of model output post-processing, namely postprocessing of said inpainted subregion of the input image. In said step machine learning model outputs are processed to match the Currently Amended input image, e.g. they can be again re-scaled, rotated, etc. Regarding rescaling, for example, if the machine learning model operated with 512×512 resolution and the Currently Amended image crop was of the resolution 1024×1024, then within the step of rescaling an 2× bicubic upscaling is performed.

Finally, the method according to the invention passes to a step of providing an output inpainted image. This step comprises blending at least one reconstructed subregion, i.e at least one inpainted image crop into the original, namely into the input high-resolution image using the original input mask in order to produce the final output image with the same resolution as the input image. The final blending operation optionally incorporates additional post-processing transformations of selected reconstructed regions. For example, when an image/mask crop was down-scaled and up-scaled during processing, additional sharpening filters are applied during the step of filtering. For example, known algorithms can be used in this filtering step like unsharp masking.

To summarize, all pre-processing steps and post-processing steps are parametrized and can be tuned to match the hardware capabilities of the target platform. This allows high resolution images to be processed in particular on mobile devices. Now in reference to FIG. 6 an image inpainting pipeline according to the invention will be described. The described pipeline can be a part of any device able to store, read and display images. The device can be a mobile phone or a tablet or any device with a mobile platform. However the shown pipeline can be also implemented within a smart TV.

Figure 6:
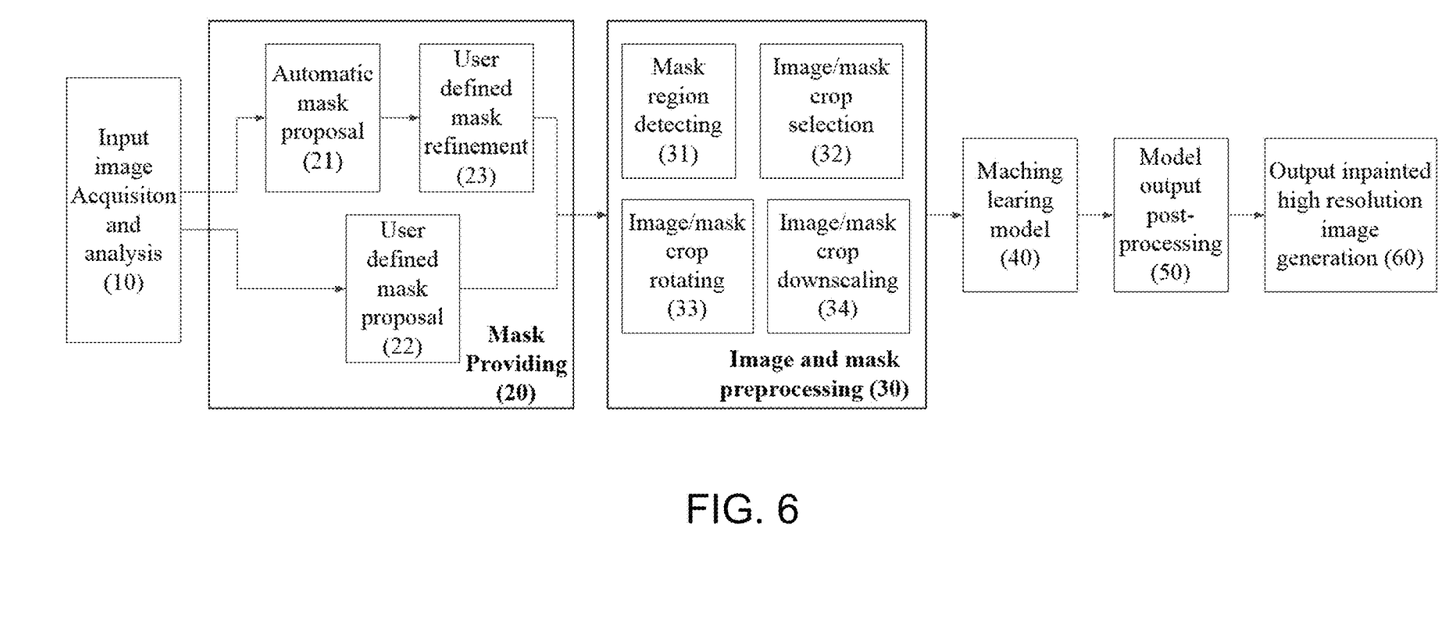
FIG. 6 shows an image pipeline according to the invention.

The image inpainting pipeline comprises an input image acquisition and analysis module 10. Said module is responsible for reading an image from a memory (not shown) in order to acquire its parameters after analyzing it and optionally for sending it to a display module (not shown). Said module outputs such parameters like: image width, image height, image format, etc.

The image inpainting pipeline within a device comprising a processing system according to the invention further comprises a mask providing module 20. Said module is responsible for acquiring at least one selected inpainting mask. It further comprises an automatic mask proposal module 21, user defined inpainting mask proposal module 22 and a user-defined mask refinement module 23. The optional automatic mask proposal module 21 is responsible for generating mask proposals based on the input image for improved user experience. The user defined inpainting mask proposal module 22 is responsible for providing manual masks by users via user interface. In practice it can be a software tool that can be used to manually identify pixel data to be removed in the image using, e.g., a paintbrush tool or an eraser tool. The user-defined mask refinement module 23 is responsible for manually correcting the masks proposed by the automatic mask proposal module. In practice it can be also a software tool that can be used to manually modify already proposed mask pixel data to be removed in the image using, e.g., a paintbrush tool or an eraser tool. Each of said modules output the binary inpainting mask and such parameters like the mask width and height (typically same as input image dimensions), and optionally the number of mask regions (this can be determined either here in the mask providing module 20 or during later processing within an input image and selected inpainting mask preprocessing module 3030).

In particular, the automatic inpainting mask proposal module 21 is a part of the invention that allows to implement more attractive User Experience for users of inpainting on mobile devices. The module can be based on one of the existing image segmentation technologies (several machine-learning based models were tested for this purpose). The segmentation model is fine-tuned for the purpose of generating high-quality inpainting masks of typically removed objects (e.g., people, cars, trash, etc.), and masks are carefully post-processed to meet the inpainting model requirements (including: smoothing and coherence improvements).

The automatic mask proposal module 21 can enhance UI experience and together with user-defined mask refinement module 23 can result in automated and attractive inpainting results (see again FIG. 2 for example).

The image inpainting pipeline within a device according to the invention further comprises an input image and selected inpainting mask preprocessing module 30. The input image and selected inpainting mask preprocessing module 30 is responsible for selecting optimal image crops (and corresponding mask crops) and producing inputs to the machine learning model. The input image and selected inpainting mask preprocessing module 30 comprises preferably a mask region detecting module 31. The mask region detection module 31 can utilize the information about mask regions passed from the module 20 (if available) in order to optimize calculations. The input image and it selected inpainting mask preprocessing module 30 comprises an image/mask crop selection module 32. This module decides which image/mask crop is optimal based on different calculations, among other based on a calculated information gain. The image/mask crop selection module 32 takes as an input the input image, the corresponding inpainting mask, and a list of different mask regions. It considers various shapes and sizes of crops, starting from the one which have the smallest possible size and with no further preprocessing.

Regarding possible image/mask crop preprocessing—the input image and selected inpainting mask preprocessing module 30 further comprises preferably an image/mask crop rotating module 33. This module is activated when the module 32 outputs a rotated crop: it is required to provide a non-rotated rectangular crop for a machine learning model. Thus, the module 33 executes a simple rotation operation in order to obtain a non-rotated rectangular input for the machine learning model. In another embodiment, the input image and selected inpainting mask preprocessing module 30 preferably comprises a downscaling module 34, which is responsible for further adjustment of parameters of the image crop and mask crop to hardware limitations The input image and selected inpainting mask preprocessing module 30 module outputs the list of image crops and the corresponding mask crops—all of them adjusted to the size and shapes supported by the machine learning model.

The image inpainting pipeline within a device according to the invention further comprises a machine learning model 40. The invention provides an end-to-end AI approach to solve the problem of inpainting. The machine learning model is a deep neural network trained using millions of real photos and millions of randomly generated masks that remove various parts of these photos. While training, it is required that the model reproduces an original image looking only at its defective version. After training, a machine learning model is obtained which can look at any input image with missing parts, and try to "imagine" the missing parts based on the non-missing areas.

According to the invention, the machine learning model itself operates in a predefined set of low resolutions (e.g. 256×256, 512×512). However, it works within a high-resolution image inpainting pipeline: high resolution input image crops are generated, processed and down-scaled to one of the supported model input sizes, and then the low-resolution model's output is again processed and up-scaled to the original high resolution. The parameters of the model (such as the supported input resolutions) and the parameters of the processing pipeline can be adjusted to the available hardware.

As mentioned earlier, the image inpainting pipeline within a device according to the invention further comprises a model output post-processing module 50. The model output post-processing module 50 works in the precisely invert direction than the pre-processing module 30. Said module is responsible for fitting/matching the machine learning outputs to the original input high resolution image, among other for up-scaling and rotating (if needed) reconstructed outputs of the machine learning model. Finally the image inpainting pipeline comprises an inpainted high resolution image generation module 60.

Figure 7:
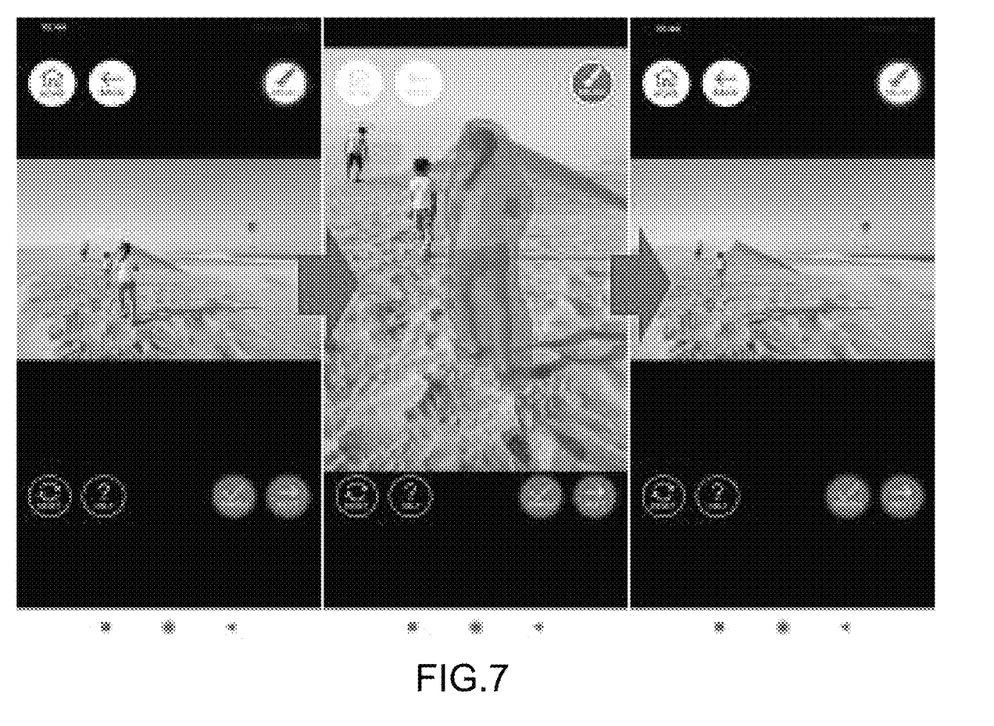
FIG. 7 shows an exemplary image viewing application on a mobile device for implementing the method according to the invention.

As mentioned earlier, the whole high resolution image inpainting pipeline can be deployed on a mobile device (e.g., on a mid-end smartphone) and execute image inpainting for 4K resolution within single seconds, obtaining visually plausible results. The proposed image inpainting pipeline allows to implement a high quality inpainting feature on a mobile device. The inpainting feature supports inpainting on high resolution images (up to 4K), utilizes powerful machine learning models to achieve competitive visual quality of results, and runs directly on a mobile computing platform (without any external services required). FIG. 7 shows sample screenshots from an exemplary inpainting application run on a mobile device.

Aspects of the present invention can be realized by a computer of a system or apparatus (or devices such as a CPU or MPU) that reads out and executes a computer program product recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the claimed computer program product is provided to the computer for example via a network or from a recording medium of various types serving as the memory device. The computer program product according to the invention comprises also a non-transitory machine-readable medium.

It should be understood that the present invention is not limited to the above examples. For those of ordinary skill in the art, improvements or changes can be made according to the above description, and all these improvements and changes should fall within the protection scope of the appended claims of the present invention.

The invention claimed is:

1. A computer-implemented method for high resolution image inpainting comprising
providing a high resolution input image;
providing at least one inpainting mask indicating at least one set of pixels to be removed and synthetized;
selecting at least one rectangular subregion of the input image and at least one aligned rectangular subregion of the inpainting mask such that the rectangular subregion of the input image encompasses at least one set of pixels to be removed and synthetized, said at least one subregion of the input image and its corresponding aligned subregion of the inpainting mask having identical minimum possible size and a position for which a calculated information gain does not decrease;
processing said subregion of the input image and its corresponding aligned subregion of the inpainting mask by a machine learning model in such a manner that an inpainted subregion of the input image along with at least one synthetized set of pixels fitting the surrounding parts of the input image both semantically and visually is received; and generating an output high resolution image comprising said inpainted subregion having at least one synthetized set of pixels fitting the surrounding parts of the input image both semantically and visually, wherein the method further comprises:

rotating the selected image subregion and selected mask subregion before processing by the machine learning model; and re-rotating the inpainted subregion outputted by the machine learning model.

2. A method according to claim 1, wherein the step of selecting at least one rectangular subregion of high resolution image and at least one aligned rectangular subregion of inpainting mask comprises acquiring information on mask regions located within the selected inpainting mask.

3. A method according to claim 2, wherein the step of selecting at least one rectangular subregion of high resolution image and at least one aligned rectangular subregion of inpainting mask comprises also a step of mask region clustering.

4. A method according to claim 1, wherein the step of providing an inpainting mask comprises an automatic inpainting mask proposal.

5. A method according to claim 1, further comprising a step of post-processing of provided inpainting mask to fulfill the machine learning model requirements.

6. A method according to claim 5, wherein the step of inpainting mask post-processing also comprises manual user-defined mask refinement.

7. A method according to claim 1, wherein it further comprises a step of downscaling of at least one selected image subregion and at least one selected mask subregion, so as to adjust its resolution to be within a predefined set of supported resolutions of the machine learning model.

8. A method according to claim 7, wherein it further comprises a step of upscaling of the inpainted subregion outputted by the machine learning model.

9. A method according to claim 1, wherein the step of generating an output high resolution image comprises blending of the inpainted subregion into the input high resolution image with the use of the provided inpainting mask.

10. A data processing system, comprising:

a processor; and a memory coupled to the processor to store instructions, which when executed by the processor, cause the processor to perform operations, the operations including:

providing a high resolution input image;

providing at least one inpainting mask indicating at least one set of pixels to be removed and synthetized;

selecting at least one rectangular subregion of the input image and at least one aligned rectangular subregion of the inpainting mask such that the rectangular subregion of the input image encompasses at least one set of pixels to be removed and synthetized, said at least one subregion of the input image and its corresponding aligned subregion of the inpainting mask having identical minimum possible size and a position for which a calculated information gain does not decrease;

processing said subregion of the input image and its corresponding aligned subregion of the inpainting mask by a machine learning model in such a manner that an inpainted subregion of the input image along with at least one synthetized set of pixels fitting the surrounding parts of the input image both semantically and visually; and generating an output high resolution image comprising said inpainted subregion having at least one synthetized set of pixels fitting the surrounding parts of the input image both semantically and visually, wherein the operations further include:

rotating the selected image subregion and selected mask subregion before processing by the machine learning model; and re-rotating the inpainted subregion outputted by the machine learning model.

11. A non-transitory memory device storing instructions, which when executed by a processor, cause the processor to perform operations comprising:

providing a high resolution input image;

providing at least one inpainting mask indicating at least one set of pixels to be removed and synthetized;

selecting at least one rectangular sub-region of the input image and at least one aligned rectangular subregion of the inpainting mask such that the rectangular subregion of the input image encompasses at least one set of pixels to be removed and synthetized, said at least one sub-region of the input image and its corresponding aligned subregion of the inpainting mask having identical minimum possible size and a position for which a calculated information gain does not decrease;

processing said sub-region of the input image and its corresponding aligned subregion of the inpainting mask by a machine learning model in such a manner that an inpainted sub-region of the input image along with at least one synthetized set of pixels fitting the surrounding parts of the input image both semantically and visually; and generating an output high resolution image comprising said inpainted sub-region having at least one synthetized set of pixels fitting the surrounding parts of the input image both semantically and visually, wherein the operations further include:

rotating the selected image subregion and selected mask subregion before processing by the machine learning model; and re-rotating the inpainted subregion outputted by the machine learning model.

* * * * *